United States Patent [19]

Zeising et al.

[11] Patent Number: 4,782,339
[45] Date of Patent: Nov. 1, 1988

[54] METHOD AND APPARATUS FOR DISPLAYING TEXT ON A SINGLE-LINE DISPLAY OF A TEXT STATION

[75] Inventors: Norbert Zeising, Oldenburg; Herbert Behrens, Neuenburg, both of Fed. Rep. of Germany

[73] Assignee: Olympia Aktiengesellschaft, Wilhelmshaven, Fed. Rep. of Germany

[21] Appl. No.: 19,788

[22] Filed: Feb. 27, 1987

[30] Foreign Application Priority Data

Feb. 27, 1986 [DE] Fed. Rep. of Germany ....... 3606361

[51] Int. Cl.⁴ .............................................. G09G 3/00
[52] U.S. Cl. .................................... 340/791; 340/792
[58] Field of Search ............... 340/706, 709, 711, 712, 340/789, 790, 791, 792; 364/200, 900; 400/83

[56] References Cited

U.S. PATENT DOCUMENTS

| | | | |
|---|---|---|---|
| 4,139,902 | 2/1979 | Bodin | 364/900 |
| 4,212,077 | 7/1980 | Vittorelli | 364/900 |
| 4,244,031 | 1/1981 | Izushima et al. | 400/83 |
| 4,360,806 | 11/1982 | von Knorre et al. | 340/706 |
| 4,403,301 | 9/1983 | Fessel | 364/900 |
| 4,408,302 | 10/1983 | Fessel et al. | 340/709 |
| 4,439,838 | 3/1984 | Klingenberg | 340/709 |
| 4,527,917 | 7/1985 | Ueno | 340/709 |
| 4,528,560 | 7/1985 | Bergermann et al. | 340/709 |
| 4,574,363 | 3/1986 | Carlgren et al. | 364/900 |
| 4,651,288 | 3/1987 | Zeising | 364/900 |

Primary Examiner—Gerald L. Brigance
Assistant Examiner—Richard Hjerpe
Attorney, Agent, or Firm—Spencer & Frank

[57] ABSTRACT

A method and apparatus to avoid disturbing an inexperienced operator of a text station, such as a typewriter or other word processing device which is equipped with a one-line display device (6), when the text approaches the end of the display device and a word must be hyphenated. In a typical conventional text station having a one-line display device, the current typing position is marked on the display device by a cursor (9) which automatically advances toward the right margin (10) until a line feed is initiated, whereupon the cursor jumps to the left margin (11) on the display device and the previously displayed text is erased. If a word is divided, the first part of the divided word is then no longer visible at a conventional text station after the automatic line feed, and for inexperienced operators this disturbs the typing rhythm. One embodiment of the present invention avoids this disturbance by resetting the cursor to the left margin after a hyphen and erasing the text except for the first part of the divided word and the hyphen at the right margin. After the second part of the divided word has been completed at the left margin, the operator actuates a control number (such as the space bar) and causes the first part of the word to also be erased. This keeps both parts of a divided word visible until the word is completed, which facilitates monitoring of the text being prepared.

20 Claims, 8 Drawing Sheets

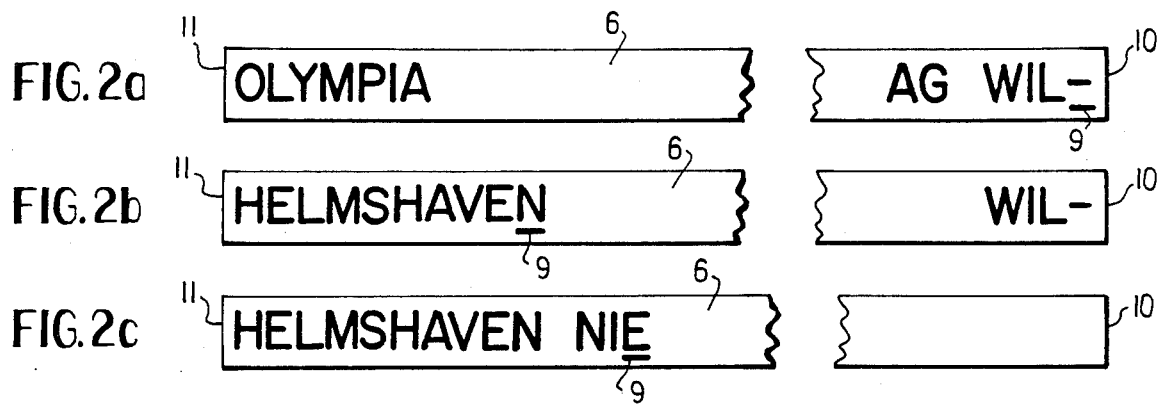
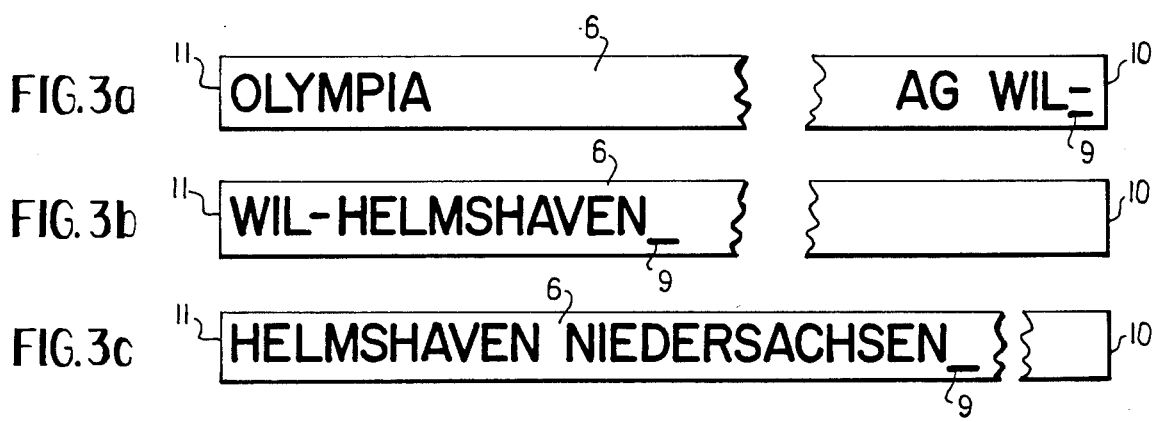
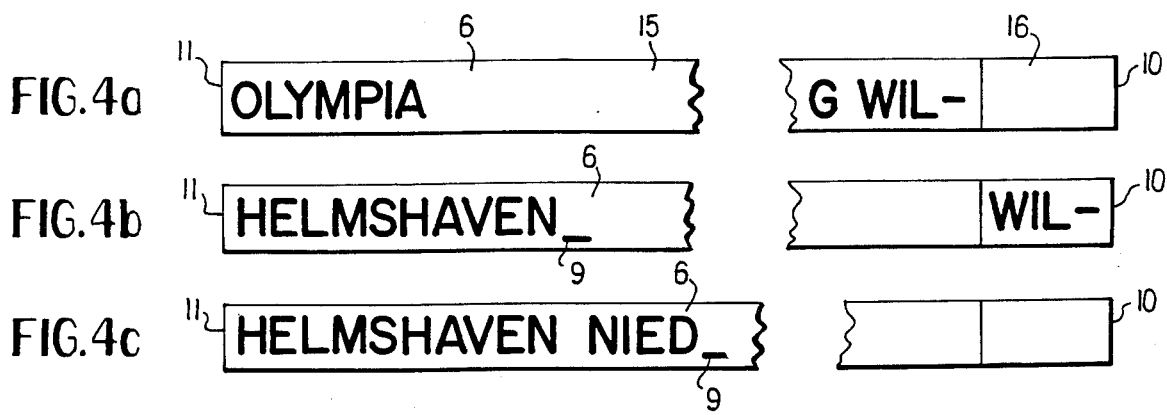

METHOD AND APPARATUS FOR DISPLAYING TEXT ON A SINGLE-LINE DISPLAY OF A TEXT STATION

BACKGROUND OF THE INVENTION

The present invention relates to a method for displaying text on a single-line display of a text station of the type which includes an input unit such as a keyboard, a text memory, and a single-line display device, the typing position being automatically indicated on the display device by a cursor which shifts automatically during input of the characters of the line of text. Moreover, the invention relates to an apparatus for implementing the method.

It is known to equip text stations such as word processors with a display unit on which a text that has been keyed in by means of a keyboard is displayed before it is printed out by means of printer. Single-line displays are customarily used as display units, on which part of a line or a whole line of the text can be displayed.

The display frequently is such that the characters are written into the display at a given, never-changing position and are shifted to the left by one character position after the input of every new character. It is also customary to write the characters into the display in the manner of a typewriter, beginning at the left margin, to correspond to the displayed text. In this case, a cursor may be provided which indicated the respective typing position. The cursor may be shifted horizontally to the left or right corresponding to the movements of the carriage of a typewriter by actuation of the space and backup keys customarily provided on a keyboard. If the cursor then reaches the right margin, actuation of a carriage return key moves the cursor back to the left margin of the display, with the previous text on the one-line display being completely erased. If a word is divided between lines, the first part of the divided word is then no longer visible. The display shows only the second divided part of the word. For less skilled operators, the erasure of the first part of the word may disturb the typing flow, since after the automatic line feed only the cut-off part of the word is visible.

SUMMARY OF THE POSITION

It is an object of the present invention to provide a method and an apparatus for displaying text on a single-line display of a text station in which the above-mentioned disturbances are avoided. This is accomplished by resetting the cursor to the left margin of the display after the hyphenation key is actuated, and erasing the displayed text except for the first part of the divided word (including the hyphen) at the right margin of the display, and then erasing the first part of the divided word after the second part thereof has been completed at the left margin of the display.

The method according to the invention makes it possible for the parts of a divided word to be visible even after a line feed until one or two further words have been entered in the new line. This reduces operator errors.

BRIEF DESCRIPTION OF THE DRAWINGS

FIGS. 2a, 2b, and 2c schematically illustrate the display device at three different stages during entry of text in an example of a first embodiment of the invention.

FIGS. 3a, 3b, and 3c schematically illustrate the display device at three different stages during entry of text in an example of a second embodiment of the invention.

FIGS. 4a, 4b, and 4c schematically illustrate the display device at three different stages during entry of the text in an example of a third embodiment of the invention.

DESCRIPTION OF THE PREFERRED EMBODIMENTS

Figure 1:
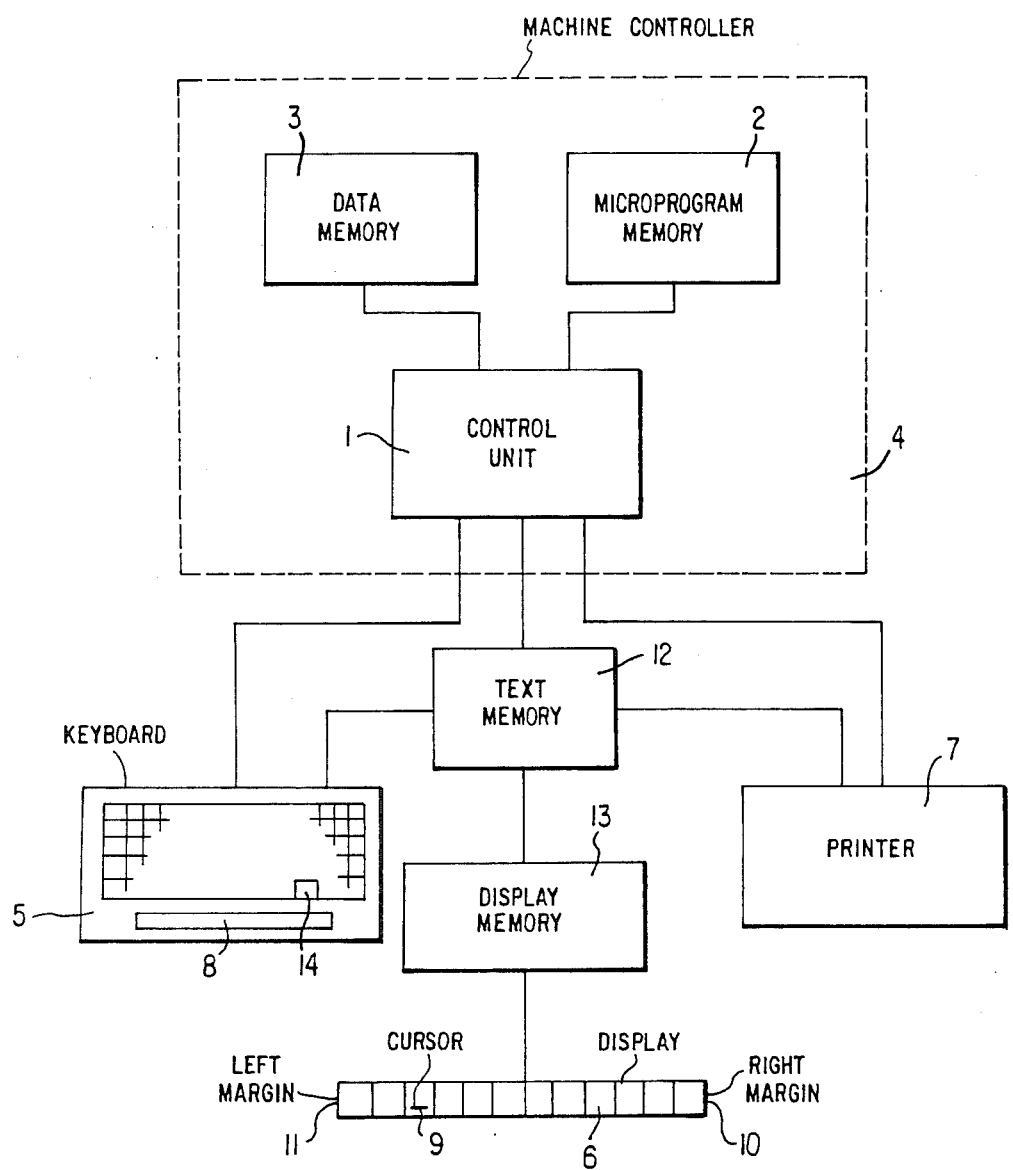
FIG. 1 is a circuit block diagram of a text station which employs the present invention.

FIG. 1 shows the circuit block diagram of a text station such as a word processor with its components which are significant for an understanding of the invention. It includes a microprogram controlled machine controller 4, composed of a central calculating and control unit 1, a microprogram memory 2 and a data memory 3. In a known manner, control unit 1 processes the data entered by means of a keyboard 5, which is equipped with typing and function keys, and emits output data to a printer 7 for display on a record carrier. In addition, the text typed in by way of keyboard 5 may be stored in a text memory 12. The text may cover one or a plurality of pages. Text memory 12 is connected with a display memory 13 for intermediate storage of one line of the text which is to be displayed on the one-line display device 6. Display memory 13 and text memory 12 may be physically realized in one common memory which itself forms a microcomputer together with machine controller 4.

The respective typing position is marked on the one-line display device 6 by means of a cursor 9, which is automatically moved in the direction of typing when characters are being typed in via the keys of keyboard 5. When cursor 9 reaches the right margin 10 of display device 6, the carriage return key is actuated in a known manner. This causes cursor 9 to return to the left margin 11 of display device 6 and, if the hyphenation key 14 has not been actuated, the text on display device 6 is completely erased.

FIGS. 2a–2c schematically illustrate display device 6 at three different stages as the text "OLYMPIA ... AG WILLHELMSHAVEN NIEDERSACHSEN ... " is being typed in, "Olympia" being the corporate name of the assignee of the present invention and "Wilhelmshaven Niedersachsen" being a city and region in the Federal Republic of Germany. If a word (such as, in this example, the name of the city Wilhelmshaven) is divided in the region of right margin 10 and hyphenation key 14 is actuated, then the first part "Wil-" of the word shown in FIG. 2a remains on the display device 6, as shown in FIG. 2b, after cursor 9 jumps to left margin 11. The first part "Wil-" remains displayed until the divided part "helmshaven" of the word has been completed and the space bar 8 has been actuated at least once. After this single or double actuation of space bar 8, as in FIG. 2c, the first part "Wil-" of the word is erased. By maintaining the display of both parts of the divided word for a short time, input is much facilitated for inexperienced operators.

Within the scope of the present invention, the control member for erasing the first part of the word at the right margin 10 on display device 6 may also respond to actuation of a punctuation key, e.g. a period.

FIGS. 3a–3c illustrate an example of a second embodiment for easier operation where, after actuation of the hyphenation key 14, the first part "Wil-" of the word including the hyphen is moved from the right margin 10 to the left margin 11 on display device 6 (see FIGS. 3a and 3b). After completion of the second part "helmshaven" of the word and actuation a control member (e.g., the space key or period key), the second part "helmshaven" of the word automatically jumps to the left margin 11 on display device 6 while pushing the first word part "Wil" and the hyphen out of display device 6 (see FIG. 3c). The control member for pushing out the first word part "Wil-" can here also be the space bar 8 or the key for the period.

In the embodiment of FIGS. 4a–4c the on-line display device 6 is provided, in addition to field 15 for displaying the text of a whole line, with an additional field 16. After actuation of the hyphenation key 14 and the resetting of cursor 9 to the left margin, the first word part "Wil-" of the divided word "Wilhelmshaven" is pushed into additional field 16 (see FIGS. 4a and 4b). After completion of the second word part "helmshaven" in field 15 of display device 6 and actuation of the space bar, the "Wil-" part of the word in additional field 16 will also be erased as illustrated in FIG. 4c.

Figure 5A:
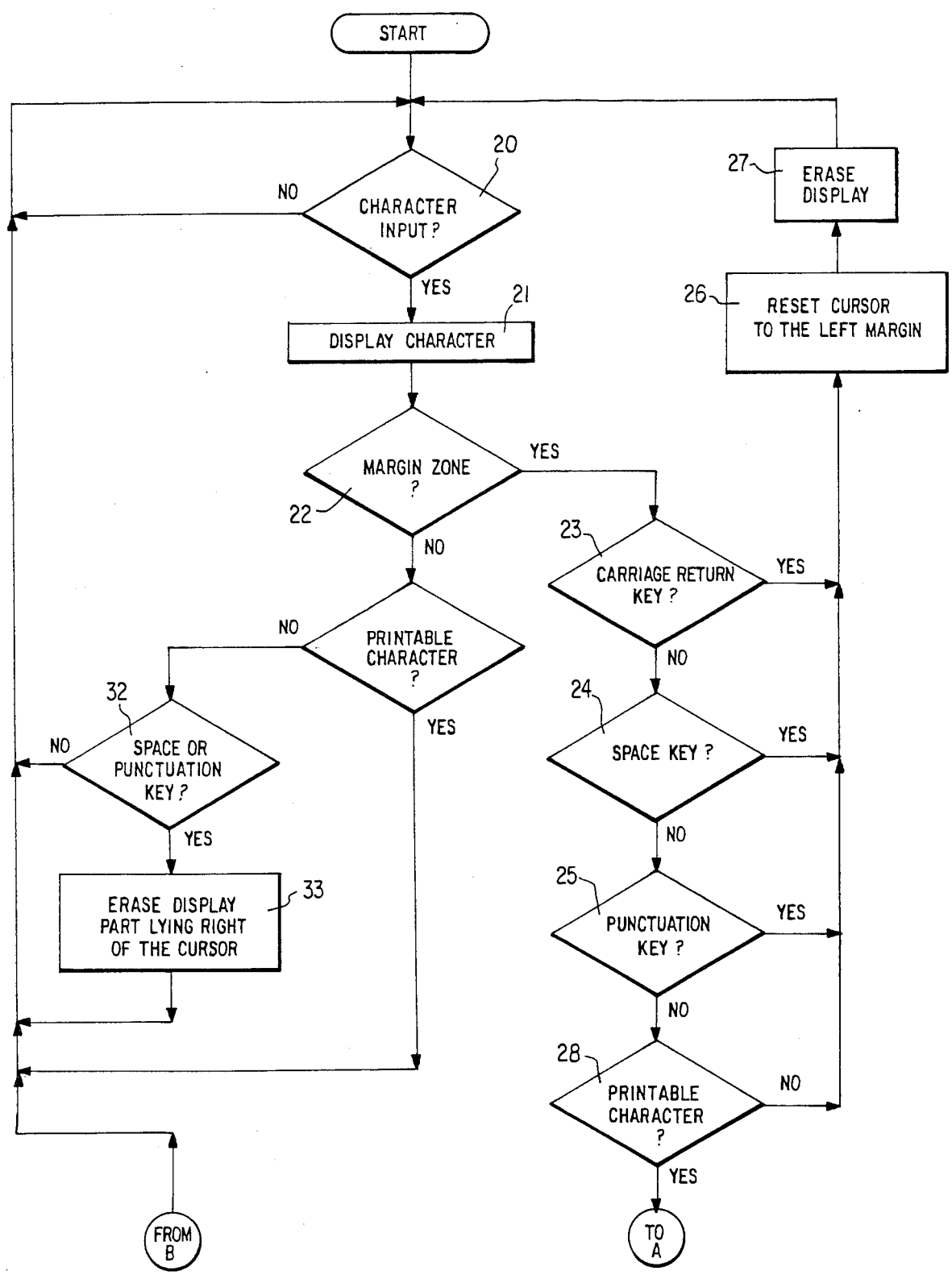
FIGS. 5a and 5b are simplified programming flow diagram illustrating the operation of the invention according to FIGS. 2a, 2b and 2c.
Figure 5B:
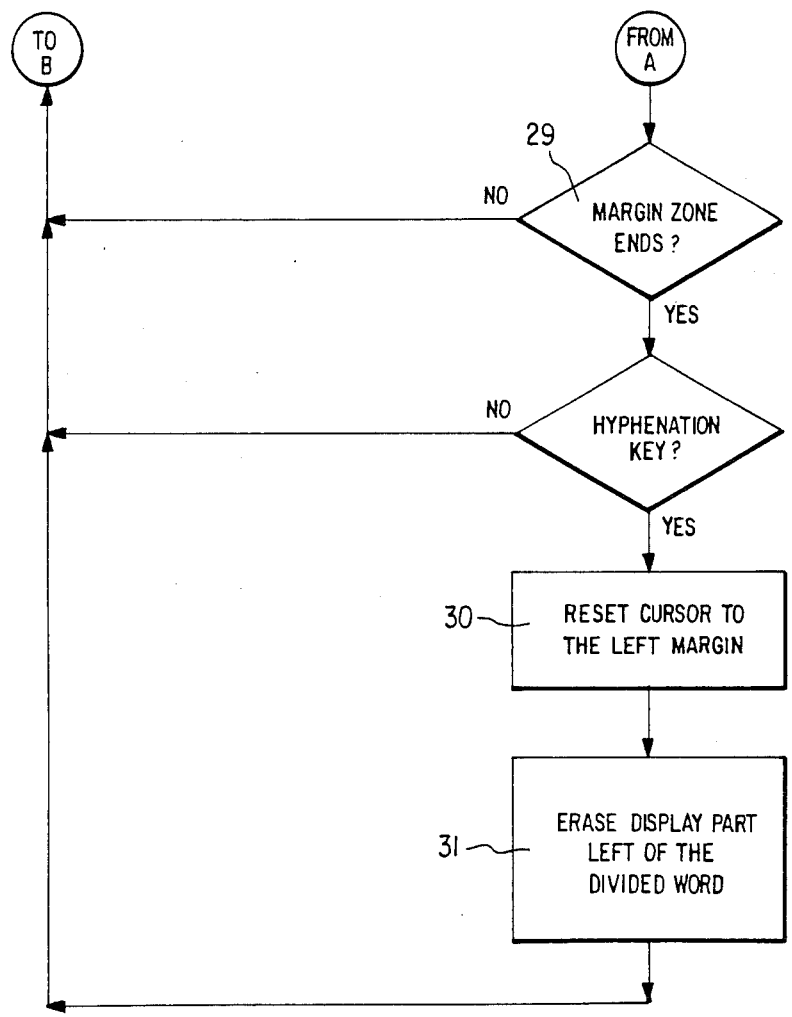

FIGS. 5a and 5b together present a simplified programming flow chart illustrating the operation of the invention as described with reference to FIGS. 2a, 2b and 2c. When the machine is starting the first action is to test character input or readout (block 20). Then the characters are displayed on the display device 6 whereby the cursor 9 is shifted stepwise by one space to the right margin (block 21). After each character input an interrogation (block 22) takes place within the machine control to determine whether the margin zone has been reached. If this is the case and if the carriage return key (block 23) or space key (block 24) or punctuation key (block 25) are actuated, the cursor will be shifted to the left margin (block 26) and the display will be erased (block 27). If there is a printable character in the margin zone (block 28), a further interrogation takes place (block 29) to determine whether or not the end of the margin zone was reached with the last input. If this is the case, the cursor will be shifted to the left margin (block 30) and the display will be erased (block 31) only on the left side of the divided word shown in FIG. 2b. When the second part of the divided word has been completed on the left part of the display and the space bar or a punctuation key has been actuated (block 32), as in FIG. 2c, the first part of the word is erased (block 33).

Figure 6A:
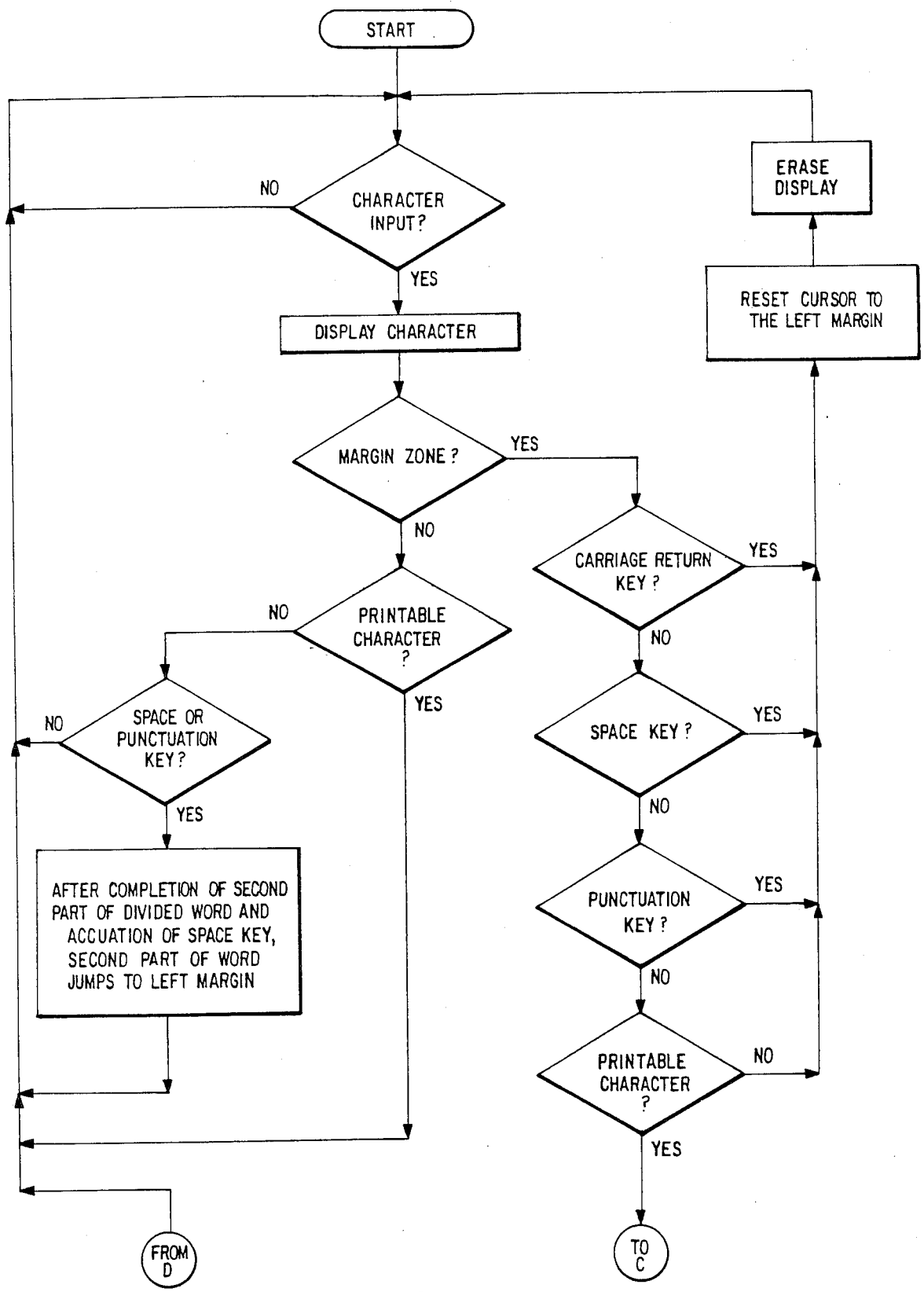
FIGS. 6a and 6b are a simplified programming flow diagram illustrating the operation of the invention according to FIGS. 3a, 3b and 3c.
Figure 6B:
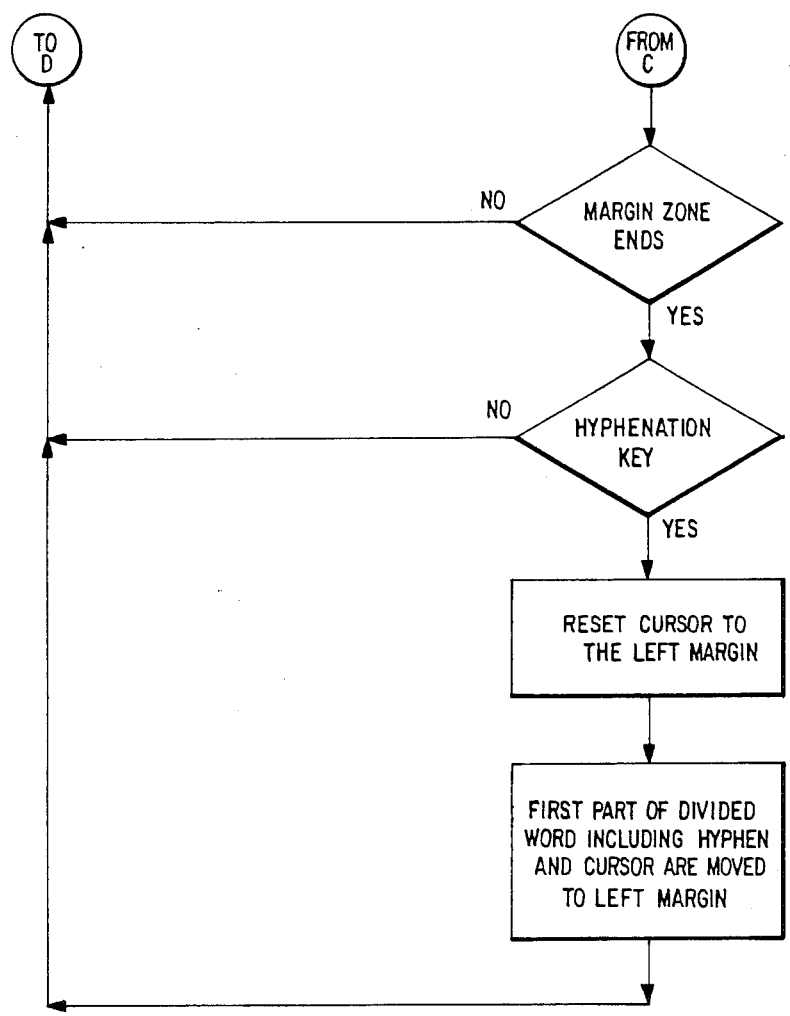
Figure 7A:
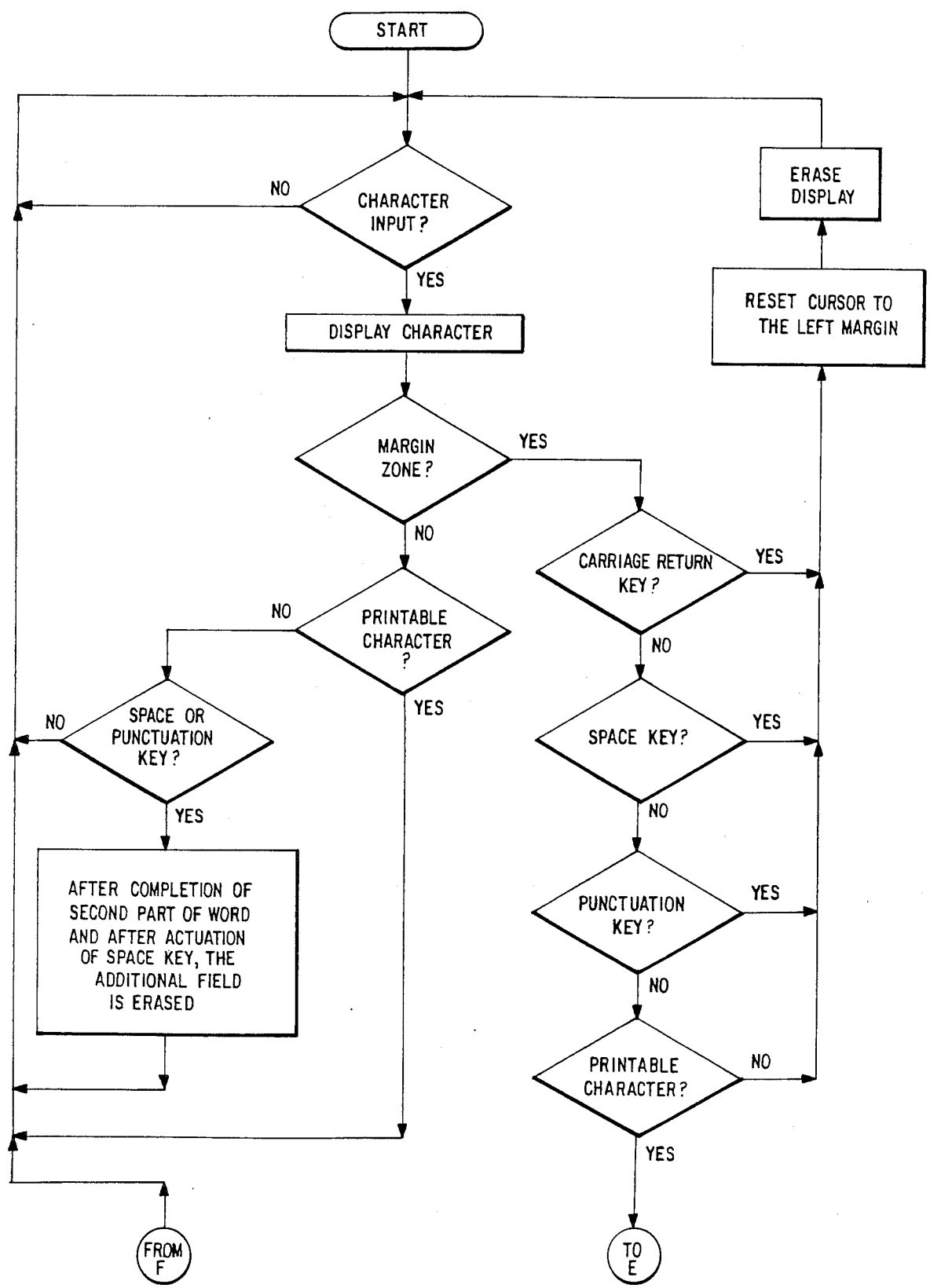
FIGS. 7a and 7b are a simplified programming flow diagram illustrating the operation of the invention according to FIGS. 4a, 4b and 4c.
Figure 7B:
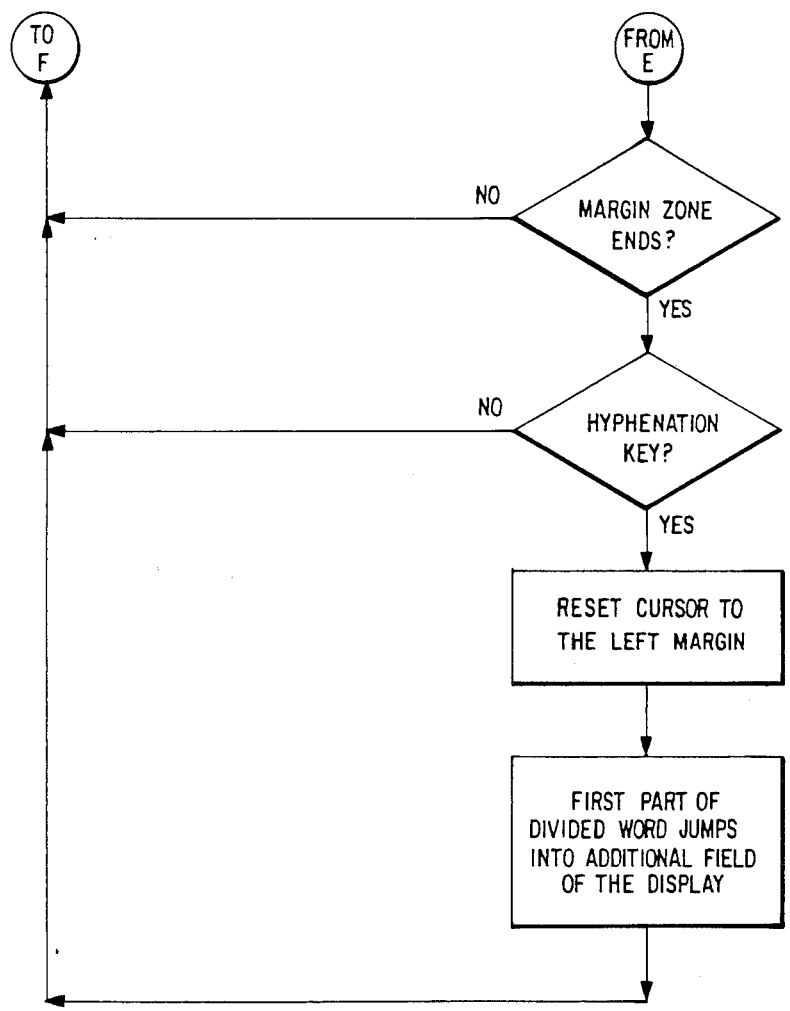

The FIGS. 6a and 6b illustrate a flow chart according to the embodiment shown in FIGS. 3a, 3b, and 3c. FIGS. 7a and 7b illustrate a flow chart according to the embodiment shown in FIGS. 4a, 4b, and 4c.

The present disclosure relates to the subject matter disclosed in Federal Republic of Germany application No. P 36 06 361.4, filed Feb. 27, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What we claim is:

1. A method for displaying text on a single-line display device of a text station which additionally includes a text memory and an input unit means for entry of text, the input unit means including a hyphenation key and a control member, the single-line display device having left and right margins and a line of character display positions between the margins, with successively entered characters of a line of text being displayed at respective display positions on the display device, said method comprising the steps of:
    (a) after actuation of the hyphen key to divide a word into first and second parts as a displayed line of text approaches the right margin of the display device, erasing the text on the display device except for the first part of the divided word and the hyphen;
    (b) thereafter displaying successively entered characters of the second part of the divided word at respective display positions adjacent the left margin of the display device; and
    (c) erasing the first part of the divided word and the hyphen when entry of the second part thereof has been completed and the control member has been actuated.

2. The method of claim 1, further comprising the step of displaying a cursor at display positions which normally shift toward the right margin as text is entered.

3. The method of claim 1, wherein the input unit means comprises a keyboard and the control member is space bar, and wherein step (c) is conducted when the space bar is depressed.

4. The method of claim 1, wherein the input unit means comprises a keyboard and the control member is a punctuation key, and wherein (c) is conducted when the punctuation key is depressed.

5. The method of claim 1, wherein the input unit means comprises a keyboard and the control member is a period key, and wherein step (c) is conducted when the period key is depressed.

6. A method for displaying text on a single-line display device of a text station which additionally includes a text memory and an input unit means for entry of text, the input unit means including a hyphenation key and a control member, the single-line display device having left and right margins and a line of character display positions between the margins, with successively entered characters of a line of text being displayed at respective display positions on the display device, said method comprising the steps of:
    (a) after actuation of the hyphen key to divide a word into first and second parts as a displayed line of text approaches the right margin of the display device, shifting the first part of the divided word and the hyphen to respective display positions adjacent the left margin and erasing the rest of the text on the display device;
    (b) thereafter displaying successively entered characters of the second part of the divided word at respective positions to the right of the first part of the divided word as the second part of the divided word is being entered; and
    (c) when entry of the second part of the divided word has been completed and the control member has been actuated, erasing the first part of the divided word and the hyphen and shifting the second part thereof to the left margin.

7. The method of claim 6, further comprising the step of displaying a cursor at display positions which normally shift toward the right margin as text is entered.

8. The method of claim 6, wherein the input unit means comprises a keyboard and the control member is a space bar, and wherein step (c) is conducted when the space bar is depressed.

9. The method of claim 6, wherein the input unit means comprises a keyboard and the control member is a punctuation key, and wherein (c) is conducted when the punctuation key is depressed.

10. The method of claim 6, wherein the input unit means comprises a keyboard and the control member is a period key, and wherein step (c) is conducted when the period key is depressed.

11. A method for displaying text on a single-line display device of a text station which additionally includes a text memory and an input unit means for entry of text, the input unit means including a hyphenation key and a control member, the single-line display device having a first field with left and right margins and line of character display positions between the margins, with successively entered characters of a line of text being displayed at respective display positions on the first field of the display device, the display device additionally having a second field, said method comprising the steps of:
(a) after actuation of the hyphen key to divide a word into first and second parts as a displayed line of text approaches the right margin of the first field of the display device, shifting the first part of the divided word to the second field of the display device and erasing the first field;
(b) thereafter displaying successively entered characters of the second part of the divided word at respective positions adjacent the left margin of the first field of the display device; and
(c) erasing the first part of the divided word from the second field of the display device when entry of the second part of the divided word has been completed and the control member has been actuated.

12. The method of claim 11, further comprising the step of displaying a cursor at display positions which normally shift toward the right margin as text is entered.

13. The method of claim 11, wherein the input unit means comprises a keyboard and the control member is a space bar, and wherein step (c) is conducted when the space bar is depressed.

14. The method of claim 11, wherein the input unit means comprises a keyboard and the control member is a punctuation key, and wherein (c) is conducted when the punctuation key is depressed.

15. The method of claim 11, wherein the input unit means comprises a keyboard and the control member is a period key, and wherein step (c) is conducted when the period key is depressed.

16. A text station, comprising:
keyboard means for entry of text, the keyboard means including a hyphenation key and at least one control member;
a text memory;
a single-line display device having left and right margins and a line of character display positions between the margins; and
control means, cooperation with the keyboard means and text memory, for displaying successively entered characters of a line of text at respective display positions on the display device, the control means additionally including
means, responsive to actuation of the hyphen key to divide a word into first and second parts as a displayed line of text approaches the right margin of the display device, for erasing the text on the display device except for the first part of the divided word and the hyphen,
means for thereafter displaying successively entered characters of the divided word at respective display positions adjacent the left margin of the display device, and
means for erasing the first part of the divided word and the hyphen when entry of the second part thereof has been completed and a control member has been actuated.

17. The text station of claim 16, wherein the control means additionally includes means for displaying a cursor on the display device at display positions which normally shift toward the right margin as text is entered.

18. The text station of claim 16, wherein the control members include a space bar and a period key.

19. A text station, comprising;
keyboard means for entry of text, the keyboard means including a hyphenation key and a control member;
a text memory;
a single-line display device having a first field with left and right margins and a line of character display positions between the margins, the display device additionally having a second field; and
control means, cooperating with the keyboard means and the text memory, for displaying successively entered characters of a line of text at respective display positions on the first field of the display device, the control means additionally including
means, responsive to actuation of the hyphen key to divide a word into first and second parts as a displayed line of text approaches the right margin of the display device, for shifting the first part of the divided word to the second field of the display device and erasing the first field,
means for displaying successively entered characters of the second part of the divided word at respective positions adjacent the left margin of the first field of the display device, and
means for erasing the first part of the divided word from the second field of the display device when entry of the second part of the divided word has been completed and the control member has been actuated.

20. The station of claim 19, wherein the control means additionally includes means for displaying a cursor on the first field of the display device at display positions which normally shift toward the right margin as text is entered.

* * * * *